(12) United States Patent
Nakamura et al.

(10) Patent No.: US 11,904,498 B2
(45) Date of Patent: Feb. 20, 2024

(54) RECEIVING TABLE FOR HONEYCOMB FORMED BODY, METHOD FOR PRODUCING HONEYCOMB FORMED BODY, AND METHOD FOR PRODUCING HONEYCOMB FIRED BODY

(71) Applicant: NGK INSULATORS, LTD., Nagoya (JP)

(72) Inventors: Hirotada Nakamura, Nagoya (JP); Nobuyuki Kuroki, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 176 days.

(21) Appl. No.: 16/778,083

(22) Filed: Jan. 31, 2020

(65) Prior Publication Data
US 2020/0290235 A1    Sep. 17, 2020

(30) Foreign Application Priority Data

Mar. 11, 2019   (JP) .................................. 2019-044143

(51) Int. Cl.
*B28B 13/04*   (2006.01)
*B29C 48/11*   (2019.01)
(Continued)

(52) U.S. Cl.
CPC .............. *B28B 13/04* (2013.01); *B29C 48/11* (2019.02); *B28B 3/269* (2013.01); *B28B 2003/203* (2013.01)

(58) Field of Classification Search
CPC ... B28B 13/04; B28B 3/269; B28B 2003/203; B28B 11/248; B28B 3/20; B28B 17/00;
(Continued)

(56) References Cited

U.S. PATENT DOCUMENTS 3,078,516 A * 2/1963 Trammell, Jr. ....... B29C 51/262
269/97
2004/0076705 A1   4/2004 Ishikawa et al.
(Continued)

FOREIGN PATENT DOCUMENTS

CN         1496801 A      5/2004
CN       102791448 A     11/2012
(Continued)

OTHER PUBLICATIONS

Chinese Office Action, Chinese Application No. 202010083368.4, dated May 26, 2022 (100 pages).
(Continued)

*Primary Examiner* — S. Behrooz Ghorishi
(74) *Attorney, Agent, or Firm* — BURR PATENT LAW, PLLC (57) ABSTRACT

A receiving table 100 for supporting a side surface of a honeycomb formed body, the side surface being parallel to a cell extending direction. The receiving table 100 comprises: a body portion 10 having a groove 11 extending in one direction; a support portion 20 comprising: a flexible sheet substrate 21 in contact with a surface of the groove 11 of the body portion 10; and a foam layer 22 attached to the flexible sheet substrate 21, the foam layer 22 being brought into contact with the side surface of the honeycomb formed body; and fixing members 30 for fixing the support portion 20 to the body portion 10. The support portion 20 is provided in a non-adhesive state to the body portion 10.

9 Claims, 4 Drawing Sheets

100

(51) Int. Cl.
*B28B 3/20* (2006.01)
*B28B 3/26* (2006.01)

(58) Field of Classification Search
CPC .............. C04B 35/622; C04B 38/0006; C04B 2235/3206; C04B 2235/3217; C04B 2235/3218; C04B 2235/3234; C04B 2235/3418; C04B 2235/3463; C04B 2235/3472; C04B 2235/3481; C04B 2235/349; C04B 2235/3826; C04B 2235/3873; C04B 2235/428; B29C 48/11; B29C 48/022; B65G 49/08
See application file for complete search history.

(56) References Cited

U.S. PATENT DOCUMENTS

| | | | | |
|---|---|---|---|---|
| 2011/0083942 | A1* | 4/2011 | Tajima | B29C 48/11 198/468.01 |
| 2013/0036612 | A1 | 2/2013 | Uoe et al. | |
| 2015/0210024 | A1* | 7/2015 | Koide | B28B 13/04 264/150 |
| 2018/0334328 | A1* | 11/2018 | Duroe | B28B 11/248 |
| 2019/0248593 | A1 | 8/2019 | Hayakawa et al. | |

FOREIGN PATENT DOCUMENTS

| | | |
|---|---|---|
| DE | 10 2006 010 393 B4 | 6/2010 |
| DE | 10 2019 000 822 A1 | 8/2019 |
| JP | H02-131903 A | 5/1990 |
| JP | 2002-103325 A1 | 4/2002 |
| JP | 2002103325 A * | 4/2002 |
| JP | 2011-079254 A1 | 4/2011 |
| WO | 2014/017379 A1 | 1/2014 |
| WO | 2017/095763 A1 | 6/2017 |

OTHER PUBLICATIONS

German Office Action (with English translation) dated Nov. 13, 2023 (Application No. 10 2020 000 639.6).

\* cited by examiner

RECEIVING TABLE FOR HONEYCOMB FORMED BODY, METHOD FOR PRODUCING HONEYCOMB FORMED BODY, AND METHOD FOR PRODUCING HONEYCOMB FIRED BODY

FIELD OF THE INVENTION

The present invention relates to a receiving table for a honeycomb formed body, a method for producing a honeycomb formed body, and a method for producing a honeycomb fired body.

BACKGROUND OF THE INVENTION

As a method for forming a honeycomb formed body, an extrusion molding method is known. In the extrusion molding method, a honeycomb formed body is produced by attaching a mold (die) having a desired shape to an extrusion outlet of an extruder in which an extrusion direction is set in a horizontal direction, and continuously extruding a ceramic material fed to the extruder from the mold (die). The honeycomb formed body is conveyed while holding its side surface parallel to a cell extending direction by a receiving table, and is subjected to processing such as cutting, drying, and firing to form a honeycomb structure.

As a receiving table for a conventional honeycomb formed body, for example, Patent Document 1 proposes to a receiving table that is obtained using a foamed body at a position where the honeycomb formed body is contacted and supported. Further, Patent Document 2 proposes to a receiving table having a support surface formed from a porous polyurethane cured product such as chemical wood.

CITATION LIST

Patent Document 1: Japanese Patent Application Publication No. 2002-103325 A
Patent Document 2: Japanese Patent Application Publication No. 2011-079254 A

SUMMARY OF THE INVENTION

The present invention provides a receiving table for supporting a side surface of a honeycomb formed body, the side surface being parallel to a cell extending direction, the receiving table comprising:
  a body portion having a groove extending in one direction;
  a support portion comprising: a flexible sheet substrate in contact with a surface of the groove of the body portion; and a foam layer attached to the flexible sheet substrate, the foam layer being brought into contact with the side surface of the honeycomb formed body; and
  fixing members for fixing the support portion to the body portion,
  wherein the support portion is provided in a non-adhesive state to the body portion.

Further, the present invention provides a method for producing a honeycomb formed body, the method comprising conveying a honeycomb formed body resulting from extrusion molding while supporting a side surface of the honeycomb formed body by the receiving table for the honeycomb formed body, the side surface being parallel to a cell extending direction.

Furthermore, the present invention provides a method for producing a honeycomb fired body, the method comprising firing the honeycomb formed body obtained by the method for producing the honeycomb formed body.

According to the present invention, it is possible to provide a receiving table for a honeycomb formed body, which can hold a side surface of the honeycomb formed body without deformation, and can also easily attach/detach and replace a support portion that is brought into contact with the side surface of the honeycomb formed body.

Also, according to the present invention, it is possible to provide a method for producing a honeycomb formed body and a method for producing a honeycomb fired body, which can hold a side surface of the honeycomb formed body without deformation, and can reduce production costs while increasing a production efficiency.

DESCRIPTION OF THE PREFERRED EMBODIMENTS

In the receiving table of Patent document 1, the portion (groove) for contacting and supporting the honeycomb formed body is formed of the foamed body, but processing accuracy is lower due to characteristics of the foamed body. Therefore, there is a problem that it is difficult to form a contact support surface corresponding to the side surface of the honeycomb formed body. Further, since the foamed body gradually degrades due to contact with the honeycomb formed body, it is necessary to replace the foamed body. However, the receiving table of Patent Document 1 needs to prepare a foamed body having a groove, which causes problem that it takes labor for the replacing work.

On the other hand, the receiving table of Patent Document 2 allows the side surface of the honeycomb formed body to be held without deformation by using the porous polyurethane resin cured product having high processing accuracy. However, the porous polyurethane resin cured product has a lower cushioning property than that of the foamed body, and hence requires stricter processing accuracy. However, there is a limit to increase the processing accuracy of the porous polyurethane resin cured product. In particular, a processing load required to finish the contact support surface corresponding to the side surface of the honeycomb formed body cannot be ignored.

The present invention has been made in order to solve the above problems. An object of the present invention is to provide a receiving table for a honeycomb formed body, which can hold the honeycomb formed body without deforming a side surface of the honeycomb formed body, and can also easily attach/detach and replace a support portion that is brought into contact with the side surface of the honeycomb formed body.

A further object of the present invention is to provide a method for producing a honeycomb formed body and a method for producing a honeycomb fired body, which can hold a side surface of the honeycomb formed body without deformation, and can reduce production costs while increasing production efficiency.

As a result of intensive studies to solve the above problems, the present inventors have found that a support portion having a flexible sheet substrate and a foam layer is provided on a surface of a body portion having a groove extending in one direction, thereby enabling a contact support surface of the foam layer suitable for holding the side surface of the honeycomb formed body to be easily obtained, and that a non-adhesive state created between the body portion and the support portion (the flexible sheet substrate) can lead to easy attachment/detachment and replacement of the support portion, and they have completed the present invention.

Hereinafter, embodiments according to the present invention will be specifically described with reference to the drawings. It is to understand that the present invention is not limited to the following embodiments, and various modifications and improvements, which will be within the scope of the present invention, may be made based on ordinary knowledge of a person skilled in the art, without departing from the spirit of the present invention.

(Receiving Table for Honeycomb Formed Body)

Figure 1:
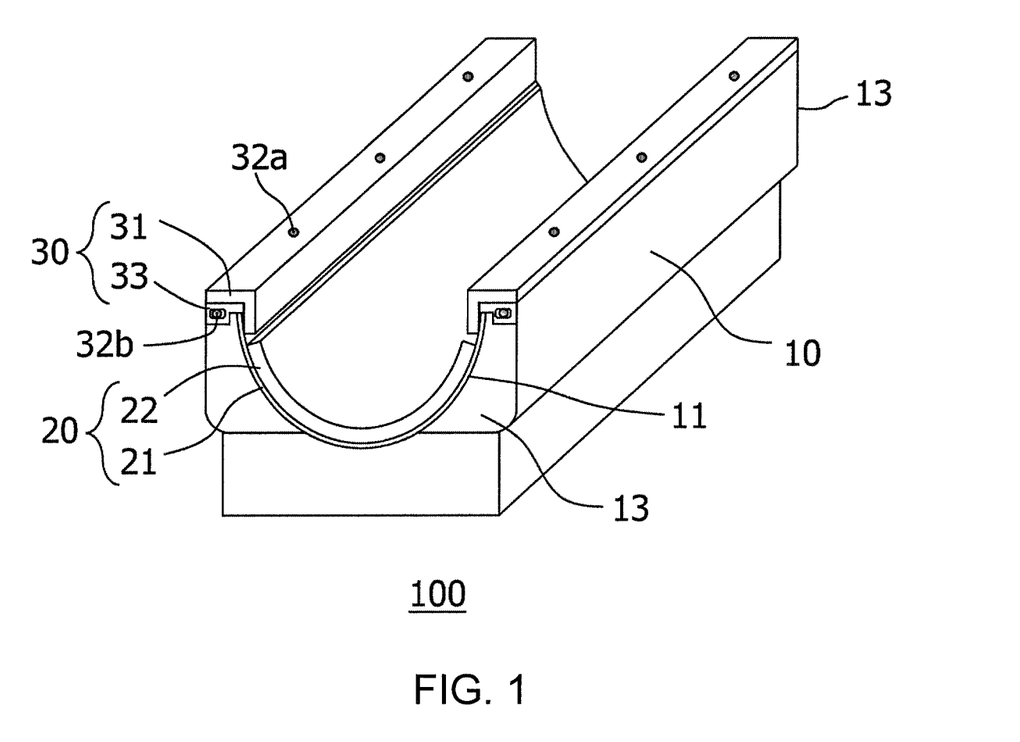
FIG. 1 is a perspective view of a receiving table for a honeycomb formed body according to an embodiment of the present invention.

FIG. 1 is a perspective view of a receiving table for a honeycomb formed body according to an embodiment of the present invention.

As shown in FIG. 1, a receiving table 100 for a honeycomb formed body according to an embodiment of the present invention includes: a body portion 10; a support portion 20 provided on the body portion 10; and fixing members 30 for fixing the support 20 to the body portion 10.

Figure 2:
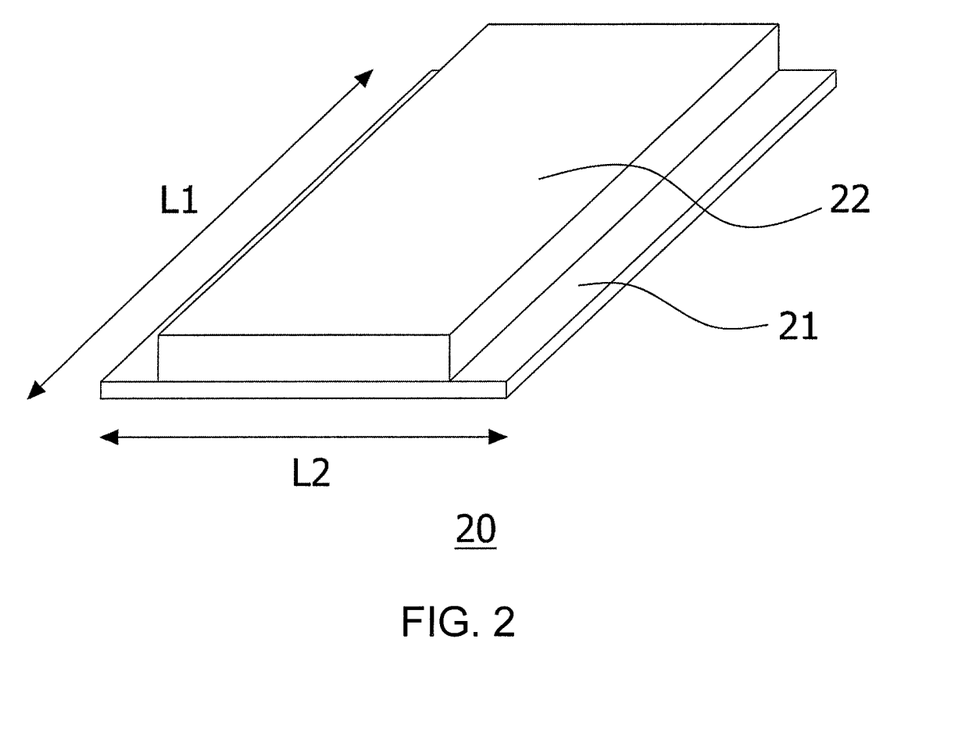
FIG. 2 is a perspective view of a support portion for use in a receiving table for a honeycomb formed body according to an embodiment of the present invention.

The body portion 10 has a groove 11 extending in one direction. A shape of the groove 11 is not particularly limited, and can be appropriately adjusted according to the shape and size of the honeycomb formed body to be held. For example, the groove 11 of the body portion 10 has substantially the same curvature (arc surface) as a lower half of a side surface parallel to a cell extending direction of the honeycomb formed body. Although FIGS. 1 and 2 show examples of the groove 11 formed in the body portion 10 where a cross section perpendicular to the cell extending direction of the honeycomb formed body is circular, it is also applicable to honeycomb formed bodies having various cross-sectional shapes such as an oval shape and a racetrack shape.

The body portion 10 is preferably formed of a hard material in terms of increasing processing accuracy of the shape of the groove 11. For the hard material, the body portion 10 is preferably formed of a hard resin in terms of weight reduction.

As the hard resin, resins known in the art can be used, and a porous polyurethane resin is preferably used. Examples of the porous polyurethane resin include chemical wood. Chemical wood is commercially available, and RAKU-TOOL® from RAMPF can be used.

The hard resin preferably has a Shore D hardness of from 40 to 70 HS. The use of the hard resin having a Shore D hardness in such a range can lead to formation of the groove 11 having a desired contour and straightness and having less variation in shape accuracy. If the Shore D hardness is less than 40 HS, the material becomes too soft, so that a cut portion is deformed during the cutting to result in difficulty in forming the groove 11 having desired shape accuracy. Further, the shape of the groove 11 may be deformed by the weight of the honeycomb formed body. On the other hand, if the Shore D hardness is more than 70 HS, the material becomes too hard, so that it takes a long time for cutting, and abrasion of a processing jig also increases, which may lead to an increase in processing costs.

As used herein, the "Shore D hardness" means a value measured in accordance with ISO 868.

The body portion 10 preferably has a density of from 0.1 g/cm$^3$ to 0.65 g/cm$^3$, although not particularly limited thereto. The density of the body portion 10 of 0.1 g/cm$^3$ or more can ensure the hardness of the body portion 10, so that the groove 11 having desired shape accuracy can be easily formed. On the other hand, the density of the body portion 10 of 0.65 g/cm$^3$ or less can prevent the body portion 10 from becoming too heavy, so that the receiving table 100 can be easily handled.

The support portion 20 provided on the body portion 10 includes: a flexible sheet substrate 21 in contact with a surface of the groove 11 of the body portion 10; and a foam layer 22 attached to the flexible sheet substrate 21 and brought into contact with the side surface of the honeycomb formed body. The support portion 20 is curved following the groove 11 of the body portion 10.

Here, FIG. 2 shows a perspective view of the support portion 20 (in a state before being mounted on the receiving table 100 for the honeycomb formed body) used for the receiving table 100 for the honeycomb formed body.

As shown in FIG. 2, the support portion 20 has a simple laminated sheet structure in which the foam layer 22 is provided on the flexible sheet substrate 21.

The support portion 20 is provided in a non-adhesive state to the body portion 10. Therefore, when the foam layer 22 brought into contact with the side surface of the honeycomb formed body are degraded over a time of use, reuse is possible by replacing only the support portion 20 having the simple laminated sheet structure.

The shape and size of the support portion 20 are appropriately set according to the shape and size of the groove 11 of the body portion 10. For example, the support portion 20 has a rectangular sheet shape having a length (L1) in a direction where the groove 11 extends and a length (L2) of the surface of the groove 11 perpendicular to the direction where the groove 11 extends.

The foam layer 22 may be provided over the entire surface of the flexible sheet substrate 21 or may be provided on a part of the surface of the flexible sheet substrate 21. For example, as shown in FIG. 2, the foam layer 22 may not be provided at one both end portions of the flexible sheet substrate 21 (both end portions of L2) in terms of facilitating the fixing of the support portion 20 by fixing member 30 (L-shaped angles 31) as described later.

The flexible sheet substrate 21 is not particularly limited as long as it can be curved following the groove 11 of the body portion 10. Examples of the flexible sheet substrate 21 include a flexible resin sheet substrate, a graphite sheet substrate, and the like. The flexible resin sheet substrate is preferably used in terms of cost. The flexible resin sheet substrate is formed of a flexible resin. Examples of the flexible resin include a PP resin, a PET resin, a PC resin, and an acrylic resin. The PP resin is preferably used.

A thickness of the flexible sheet substrate 21 is not particularly limited as long as it does not impair flexibility. It is preferably from 0.1 to 1.0 mm. When the thickness is within such a range, the flexible sheet substrate 21 can be stably curved following the groove 11 of the body portion 10.

The foam layer 22 is not particularly limited as long as it can be curved following the groove 11 of the body portion 10 together with the flexible sheet substrate 21. Examples of the foam layer 22 include a layer formed of a resin foam (hereinafter, referred to as a "resin foam layer") and a layer formed of a rubber foam (hereinafter, referred to as a "rubber foam layer"). Examples of the resin foam include a polyethylene foam, a urethane foam, a silicone foam, an acrylic foam, a polyvinyl chloride foam and the like. Examples of the rubber foam include a urethane rubber foam, a nitrile rubber foam, a chloroprene rubber foam, an ethylene rubber foam, a silicone rubber foam, and a fluoro rubber foam. These foams can be used alone or in combination of two or more.

The foam layer 22 preferably has open cells. The open cells have a higher cushioning property than that of closed cells, so that the honeycomb formed body can be held without deforming the side surface.

The foam layer 22 preferably has a density of from 10 to 40 $g/cm^3$, and more preferably from 10 to 30 $g/cm^3$, and still more preferably from 10 to 15 $g/cm^3$, although not particularly limited thereto. The controlling of the density of the foam layer 22 within the above range can result in the foam layer 22 having flexibility and elasticity suitable for holding the side surface of the honeycomb formed body.

The contact surface of the foam layer 22 preferably has a 25% hardness of 130 N or less, and more preferably 60 N or less, although not particularly limited thereto. The controlling of the 25% hardness of the contact surface within the above range can result in the foam layer 22 having a contact surface with a hardness suitable for holding the side surface of the honeycomb formed body.

As used herein, the 25% hardness of the contact surface of the foam layer 22 means a hardness at the time of 25% compression measured in accordance with JIS K6401: 2011. More particularly, it is a load value (Newton) when the foam layer 22 is compressed once to 75% of its initial thickness (original thickness), and the foam layer 22 then returns to the original thickness, and the foam layer 22 is then pressed to 25% of the original thickness and maintained for 20 seconds.

The foam layer 22 preferably has a thickness of from 10 to 20 mm, although not particularly limited thereto. The thickness of the foam layer 22 of 10 mm or more can sufficiently ensure the cushioning property (impact absorbing power) of the foam layer 22. On the other hand, the thickness of the foam layer 22 of 20 mm or less can curve the foam layer 22 following the groove 11 of the body portion 10 together with the flexible sheet substrate 21.

The flexible sheet substrate 21 and the foam layer 22 are attached together using an adhesive or a double-sided adhesive tape. Among them, the flexible sheet substrate 21 and the foam layer 22 may preferably be attached together using the double-sided adhesive tape. This is because when the adhesive is used, the adhesive may enter bubbles of the foam layer 22, thereby deteriorating the cushioning property of the foam layer 22.

The fixing member 30 is not particularly limited as long as it is a jig capable of fixing the support portion 20 to the body portion 10.

Figure 3A:
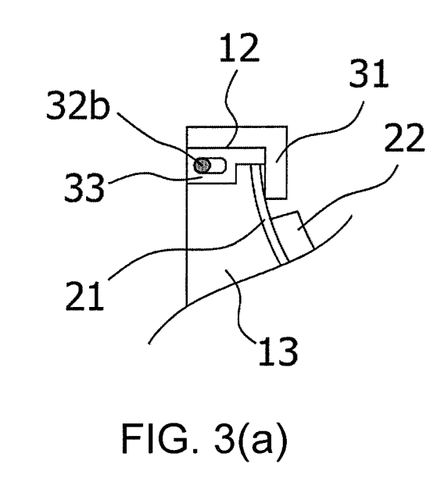
FIGS. 3(a) and 3(b) are partially enlarged side views around a fixing member of a receiving table for a honeycomb formed body according to an embodiment of the present invention.
Figure 3B:
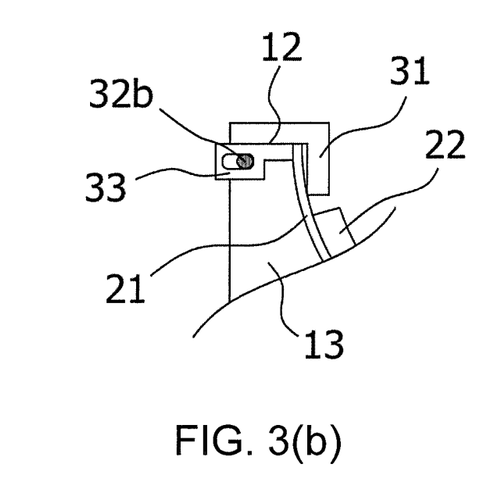

Here, FIGS. 3(a) and 3(b) show partially enlarged side views around the fixing member 30 (a partially enlarged cross-sectional view of an end face perpendicular to a direction where the groove 11 of the body portion 10 extends).

Each fixing member 30 can include an L-shaped angle 31 that comes into contact with both an upper surface 12 of the body portion 10 and the flexible sheet substrate 21 of the support portion 20, for example as shown in FIGS. 1 and 3.

Each L-shaped angle 31 is provided to prevent the support portion 20 from moving along the groove 11 of the body portion 10. The L-shaped angle 31 can fix the support portion 20 by sandwiching the flexible sheet substrate 21 between the L-shaped angle 31 and the groove 11 of the body portion 10 and tightening them with bolts 32a or the like.

Further, as shown in FIGS. 1 and 3, the fixing members 30 can include opening/closing plates 33 provided on two end faces 13 perpendicular to the direction where the groove 11 of the body portion 10 extends.

Each opening/closing plate 33 is provided to prevent the support portion 20 from moving in a direction parallel to the direction where the groove 11 of the body portion 10 extends. As shown in FIG. 3(a), each opening/closing plate 33 is closed by sliding on the end face 13 and is fixed with a bolt 32b or the like, so that the support portion 20 can be fixed between the two end faces 13. Further, as shown in FIG. 3(b), each opening/closing plate 33 can be opened by loosening the bolt 32b and sliding on the end face 13, so that the support portion 20 can be removed from the end face 13 side.

The receiving table 100 for the honeycomb formed body, which has the above structure, ensures a shape for holding the side surface of the honeycomb formed body by the groove 11 of the body portion 10, and maintain the cushioning property by the foam layer 22 of the support portion 20 provided on the groove 11, so that the honeycomb formed body can be held without deforming the side surface. Further, the support portion 20 has a simple laminated sheet structure in which the foam layer 22 is provided on the flexible sheet substrate 21, and is also in a non-adhesive state between the body portion 10 and the support portion 20. Therefore, when the foam layer 22 of the support portion 20 that comes into contact with the side surface of the honeycomb formed body is degraded, only the support portion 20 needs to be replaced and it does not take labor for the replacing work.

(Method for Producing Honeycomb Formed Body and Honeycomb Fired Body)

A method for producing a honeycomb formed body according to an embodiment of the present invention conveys the honeycomb formed body while supporting the side surface parallel to the cell extending direction of the honeycomb formed body resulting from extrusion molding by the above receiving table 100 for the honeycomb formed body.

Figure 4:
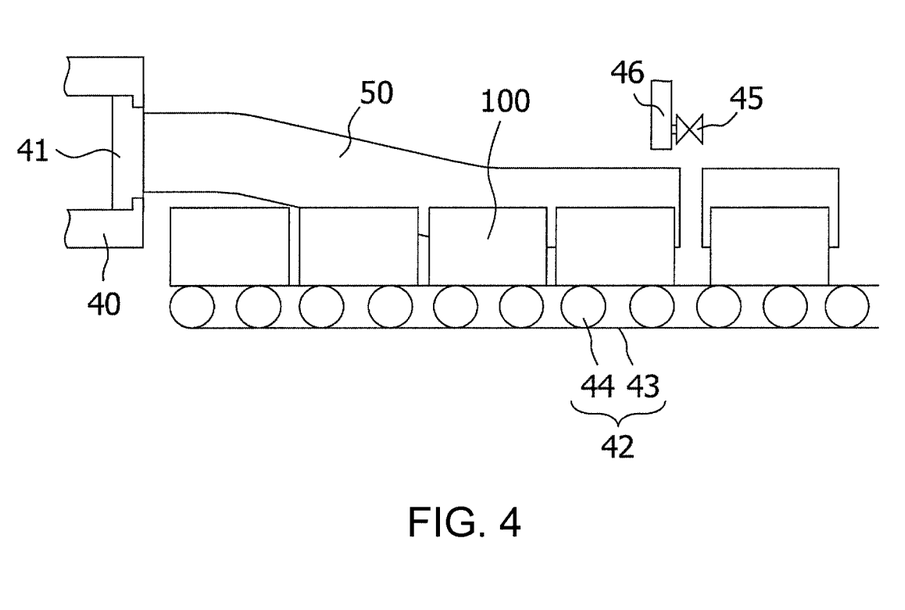
FIG. 4 is a schematic view for explaining a state where an extruded honeycomb formed body is delivered onto a receiving table and conveyed.

FIG. 4 is a schematic view for explaining a state where the extruded honeycomb formed body is delivered to the receiving table 100 and conveyed.

As shown in FIG. 4, a honeycomb formed body 50 extruded from a die 41 of an extruder 40 is delivered to the receiving table 100 arranged on a conveying path 42 located upstream in an extrusion direction of the extruder 40. At this time, it is preferable that an extrusion speed of the honeycomb formed body 50 and a speed of the conveying path 42 are substantially the same in order to smoothly deliver the honeycomb formed body 50 onto the receiving table 100. The conveying path 42 is not particularly limited, but it is preferably a conveyor system having a belt 43 and rollers 44.

The receiving table 100 holding the honeycomb formed body 50 is conveyed on the conveying path 42 in the conveying direction. A cutting unit for the honeycomb formed body 50 may be provided in the middle of the conveying path 42. As the cutting unit for the honeycomb formed body 50, a cutting jig 46 having a wire hung between a pair of bobbins 45 can be used. For example, the honeycomb formed body 50 can be cut by lowering the cutting jig 46 provided above the conveying path 42.

The cut honeycomb formed body 50 is then subjected to a drying process and optionally a process such as plugging. The honeycomb formed body 50 can be then placed in a firing furnace and fired to form a honeycomb fired body.

The firing temperature is appropriately set according to the raw materials used for producing the honeycomb formed body 50. For example, when the honeycomb formed body 50 is produced using a cordierite forming raw material, the firing temperature is preferably from 1380 to 1450° C., and more preferably from 1400 to 1440° C. The firing time for maintaining the firing temperature is generally from 3 to 10 hours, although not particularly limited thereto.

The method for producing the honeycomb formed body 50 by extrusion molding is not particularly limited, and can be carried out according to a known method. For example, a green body containing ceramic powder, a binder, water and the like may be charged into the extruder 40 and extruded.

Examples of the ceramic powder include cordierite forming raw materials, silicon carbide, mullite, alumina, aluminum titanate, silicon nitride, cordierite-silicon carbide composite materials, lithium aluminum silicate, metallic silicon, or mixtures thereof. These can be used alone or in combination of two or more. The cordierite-forming raw material means a material that is converted into cordierite by firing, including, for example, materials obtained by mixing talc, kaolin, alumina, aluminum hydroxide, and/or silica such that a composition after firing is a theoretical composition of cordierite ($2MgO \cdot 2Al_2O_3 \cdot 5SiO_2$). The cordierite forming raw material typically has a composition containing from 40 to 60% by mass of silica, from 15 to 45% by mass of alumina, and from 5 to 30% by mass of magnesia.

Examples of the binder include, but not particularly limited to, organic binders such as agar, hydroxypropylmethylcellulose, methylcellulose, hydroxyethylcellulose, carboxymethylcellulose, and polyvinyl alcohol. These can be used alone or in combination of two or more.

The shape of the honeycomb formed body 50 produced by the extruder 40 is not particularly limited, and it is appropriately set depending on applications to be used.

The honeycomb formed body 50 produced by the extruder 40 has partition walls that define cells extending in the extrusion direction. The shape of each cell in a cross section perpendicular to the cell extending direction of the honeycomb formed body 50 may be various shapes such as a circle, an ellipse, and a polygon such as a triangle to an octagon, although not particularly limited thereto. The outer shape of the cross section perpendicular to the cell extending direction of the honeycomb formed body 50 may be various shapes such as a circular shape, an oval shape, and a racetrack shape, although not particularly limited thereto.

The number of cells per $cm^2$ in the cross section perpendicular to the cell extending direction of the honeycomb formed body 50 is preferably from 30 to 180, and more preferably from 30 to 150, and even more preferably from 30 to 93, and most preferably from 30 to 62, although not particularly limited thereto.

The thickness of each partition wall in the cross section perpendicular to the cell extending direction of the honeycomb formed body 50 is preferably from 0.05 to 0.30 mm, and more preferably from 0.05 to 0.10 mm, and even more preferably from 0.1 to 0.10 mm, and still more preferably from 0.05 to 0.08 mm, although not particularly limited thereto. The partition wall thickness can be measured by, for example, an image analyzer (trade name "NEXIV, VMR-1515" from Nikon Corporation).

A width of the honeycomb formed body 50 in the cross section perpendicular to the cell extending direction (a diameter for the circular shape, and a diameter of the longest portion for the ellipse shape or the like) is preferably 70 cm or more, and more preferably 115 cm, and even more preferably 170 cm or more, although not particularly limited thereto.

The honeycomb formed body 50 having the number of cells, the partition walls, and the width as described above tends to generate local deformation in the partition walls on the inner side of the honeycomb formed body, rather than in the partition walls on the outer periphery of the honeycomb formed body 50, when the honeycomb formed body 50 comes into contact with the receiving table 100. However, by using the receiving table 100 according to the embodiment of the present invention, the local deformation can be suppressed, so that a decrease in yield can be suppressed.

The honeycomb formed body 50 having the above shape can be obtained by appropriately setting the structure of the die 41 provided at the tip of the extruder 40.

The honeycomb formed body 50 and the honeycomb fired body produced as described above are produced using the receiving table 100 for the honeycomb formed body 50, which can hold the side surface of the honeycomb formed body 50 without being deformed, and easily detach/attach the support portion 20 that is brought into contact with the side surface of the honeycomb formed body 50, so that the side surface of the honeycomb formed body 50 is not deformed, and the production costs can be reduced while increasing the production efficiency.

The honeycomb fired body produced as described above can be used for various applications such as catalyst supports for purifying automobile exhaust gases, diesel particulate removal filters, gasoline particulate removal filters, and heat storage bodies for combustion devices.

DESCRIPTION OF REFERENCE NUMERALS

10 body portion
11 groove
12 upper surface
13 end face
20 support portion
21 flexible sheet substrate
22 foam layer
30 fixing member
31 L-type angle
32a, 32b bolt
33 opening/closing plate
40 extruder
41 die
42 conveying path
43 belt
44 roller
50 honeycomb formed body
100 receiving table

The invention claimed is:

1. A receiving table for supporting a side surface of a honeycomb formed body, the side surface being parallel to a cell extending direction, the receiving table comprising:
  a body portion having a groove extending in one direction;

a support portion comprising: a flexible sheet substrate in contact with a surface of the groove of the body portion; and a foam layer attached to the flexible sheet substrate, the foam layer being brought into contact with the side surface of the honeycomb formed body; and fixing members for fixing the support portion to the body portion, wherein the support portion is provided in a non-adhesive state to the body portion;

the flexible sheet substrate has a thickness of 0.1 to 1.0 mm;

each of the fixing members comprise an L-shaped angle that is in contact with an upper surface of the body portion and the flexible sheet substrate of the support portion, and opening/closing plates provided on two end faces of the body portion perpendicular to a direction where the groove of the body portion extends configured to fix the support portion between the two end faces; and the L-shaped angle portion of each of the fixing members is separate from the opening/closing plates.

2. The receiving table for the honeycomb formed body according to claim 1, wherein the foam layer is a resin foam layer or a rubber foam layer.

3. The receiving table for the honeycomb formed body according to claim 1, wherein the foam layer has open cells.

4. The receiving table for the honeycomb formed body according to claim 1, wherein the flexible sheet substrate is formed of a flexible resin.

5. The receiving table for the honeycomb formed body according to claim 1, wherein the body portion is formed of a hard resin.

6. The receiving table for the honeycomb formed body according to claim 1, wherein the flexible sheet substrate is formed of a flexible resin selected from the group consisting of a PP resin, a PET resin, a PC resin, and an acrylic resin.

7. A method for producing a honeycomb formed body, the method comprising conveying a honeycomb formed body resulting from extrusion molding while supporting a side surface of the honeycomb formed body by the receiving table for the honeycomb formed body according to claim 1, the side surface being parallel to a cell extending direction.

8. The method for producing the honeycomb formed body according to claim 7, wherein the method comprising cutting the honeycomb formed body supported by a cutting table.

9. A method for producing a honeycomb fired body, the method comprising firing the honeycomb formed body obtained by the method for producing the honeycomb formed body according to claim 7.

* * * * *